Nov. 22, 1955

J. C. NEWTON ET AL 2,724,564

AUTOMATIC SPEED CONTROL FOR AIRCRAFT

Filed July 9, 1948

INVENTORS
JOHN C. NEWTON
MAX I. BEERS
BY
Herbert H. Thompson
their ATTORNEY.

Nov. 22, 1955   J. C. NEWTON ET AL   2,724,564
AUTOMATIC SPEED CONTROL FOR AIRCRAFT
Filed July 9, 1948   2 Sheets-Sheet 2
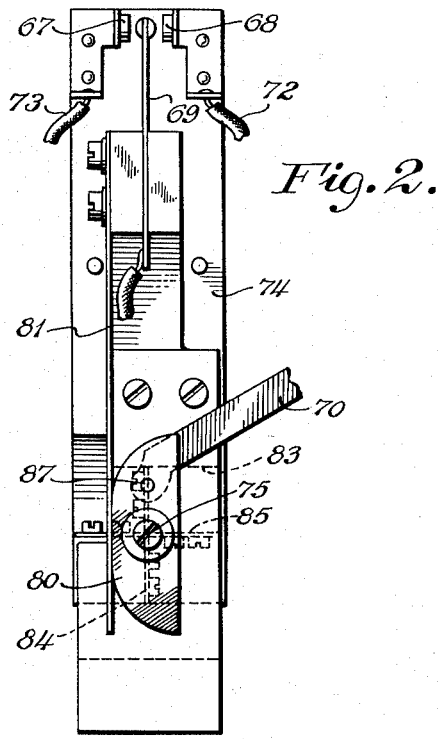
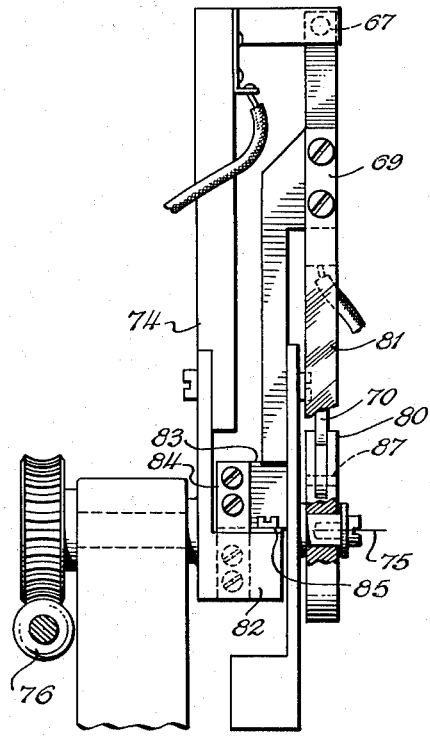
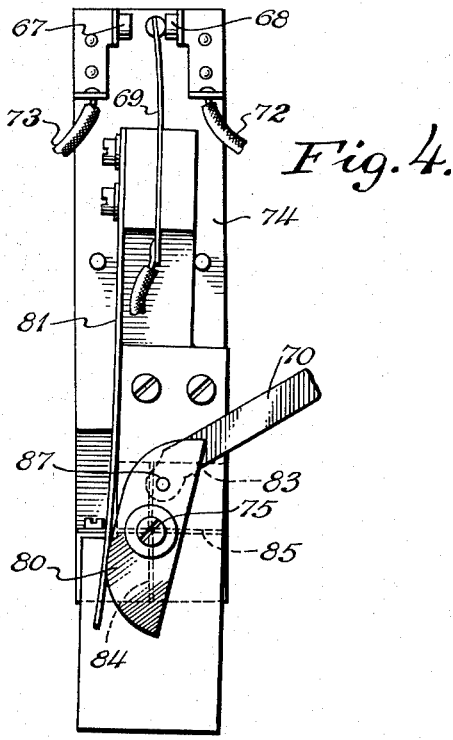
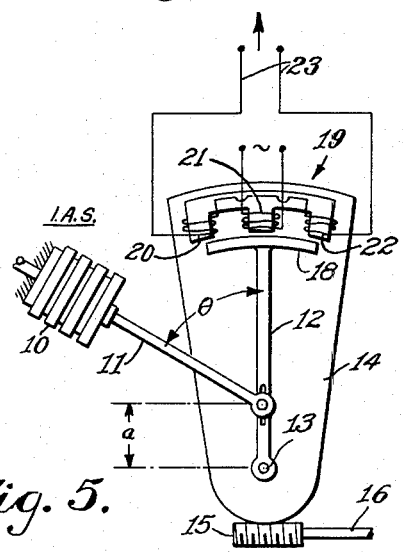
INVENTORS
JOHN C. NEWTON
MAX I. BEERS
BY
Herbert A. Thompson
Their ATTORNEY.

р

United States Patent Office 2,724,564
Patented Nov. 22, 1955

2,724,564

AUTOMATIC SPEED CONTROL FOR AIRCRAFT

John C. Newton, Roslyn Heights, and Max Irwin Beers, Great Neck, N. Y., assignors to Sperry Rand Corporation, a corporation of Delaware Application July 9, 1948, Serial No. 37,936

15 Claims. (Cl. 244—77)

This invention relates to improved means for the automatic control of the speed of aircraft especially of high speed aircraft capable of operating at speeds approaching the velocity of sound in air. The invention is chiefly applicable to radio controlled pilotless aircraft but the apparatus may be operated manually by a pilot in the craft.

The invention makes use of the well-known Pitot tube as a datum for indicating the air speed. It is known that if such a tube is calibrated to show the true air speed at ground level, then the indicated air speed will be progressively less than the true air speed as the barometric pressure decreases with increase of height. The speed indicated by the differential air pressure of the Pitot tube and static tube is hereinafter referred to by the initials IAS for Indicated Air Speed.

It is a primary object of the present invention to control the engine throttle or other controller of the fuel supply to the motor in the craft so as to maintain the IAS constantly at a value set by the human operator who may be either in the airplane or on the ground and using radio control.

Another object of the invention is to provide means suitable for operation by radio signals for increasing or decreasing at will the IAS so set irrespective of the altitude of flight.

Still another object of the invention is to enable the craft to be flown automatically at a known predetermined cruising speed.

A further object is to provide limiting devices which will maintain the speed of the craft within safe limits either of IAS or flight Mach number.

As is well-known, aircraft cannot be safely flown at the velocity of sound in the surrounding air unless they are of special construction. This critical velocity is dependent upon the density of the local atmosphere, whence it follows that an IAS which would be safe at low altitudes might be above the critical velocity at high altitudes.

The flight Mach number is the ratio of the actual speed of the craft to the velocity of sound in air at the pressure and temperature of the atmosphere through which the craft is flying.

A feature of the present invention therefore is the combination of a barometer with the IAS control so as to control the IAS within safe limits by preventing the engine throttle from being closed to a point where the craft would be liable to stall or from being opened sufficiently to exceed a maximum IAS or a safe Mach number, whichever is the lower. For example, the limiting devices may be set so that the speed will not be reduced below 120 miles per hour or increased above 560 miles per hour IAS or increased to a speed exceeding a Mach number of 0.8 which at 40,000 feet barometric altitude would be approximately 280 miles per hour IAS, though at a low altitude the same Mach number would not be exceeded at twice that IAS.

Other features, objects and advantages of the invention will appear from the following description when read in conjunction with the accompanying drawings which are to be taken as illustrative of the principles of the invention and not binding as to detail.

In the drawings,

Fig. 1 is a schematic electrical and mechanical diagram of the invention;

Fig. 2 is a front view of an alternative arrangement of part of Fig. 1;

Fig. 3 is a side view of the part shown in Fig. 2,

Fig. 4 shows in detail the part illustrated in Fig. 2 in an actuated position; and Fig. 5 is a detailed view of a portion of the apparatus illustrated in Fig. 1.

Referring to Fig. 1 a Pitot bellows 10, preferably of elastic metal, is supplied with pressure air from a Pitot tube so that the extension of the bellows gives a measure of the IAS. The bellows 10 is connected by a link 11 to an arm 12 pivoted at 13 on a sector-shaped plate 14 which is itself independently rotatable about the same axis 13 by means of worm 15 engaging the toothed lower part of plate 14. Spur reduction gear may be employed if desired in place of the worm gear. The arm 12 carries at its upper end a soft iron armature 18 cooperating with a conventional E pick-off 19 having three poles 20, 21 and 22, each pole being provided with windings. The winding of the middle pole 21 is constantly excited from a source (not shown) of single phase alternating current and the arrangement is such that when the armature 18 is symmetrically placed opposite the three poles of the E, equal A. C. voltages are induced in the windings of poles 20 and 22 in which case these two windings being connected in series opposition will balance one another. When, however, under the action of the bellows 10 the armature 18 is displaced to right or left, the voltages in the coils 20 and 22 will no longer balance but one will overpower the other and send a current through the connecting wires 23 to the amplifier 24. The output of this amplifier then drives the servomotor 25 in one direction or the other according to the direction of the displacement of armature 18 to thereby open or close the throttle 31 through motor shaft extension 30.

It is necessary to provide a feedback signal to annul the effect of the error signal progressively as the throttle opening changes. If this were done by the ordinary mechanical or electrical feedback and the repeat back signal matched the input control signal, the displacement of the throttle would be proportional to the IAS signal. Such a system would be satisfactory where the throttle opening had a fixed relation to the IAS, but because the IAS is influenced not only by the throttle, but by other factors which affect lift or drag in flight, a direct feedback is not convenient for automatic control of the throttle to maintain a constant IAS. We have therefore shown the type of feedback described in U. S. patent application Serial No. 724,020, filed January 24, 1947, in the name of Richard N. Bromley and assigned to the assignee of the present invention. The said Bromley application, Serial No. 724,020, issued on January 27, 1953, as U. S. Patent No. 2,626,767. In the present case the motor 25 is coupled to a generator 26 which (as shown) runs at the same speed as the motor and generates a unidirectional voltage proportional to the speed of the motor, with a polarity depending on the direction of rotation. Alternatively the generator may be driven by gearing to run at a speed proportional to but different from that of the motor. The generator is connected by leads 27 to a time-integrating device 28. Amplifier 24 and integrator 28 may be constructed as shown by Bromley in the aforementioned patent application, and the details thereof are not shown in Fig. 1. The voltage derived from generator 26 being proportional to the speed of the motor it follows that the time integral of that voltage is proportional to the number of revolutions made by the motor. This integrated output is represented by the charge of a condenser which, when the generator speed falls off, is slowly discharged through a high resistance in series with the generator armature so that the voltage falls to zero at a rate approximately equal to the rate at which the error signal is normally reduced to zero by the operation of the servo system. This decaying voltage is fed by leads 29 to the amplifier 24 in a sense opposing the signal, thus providing a repeat back signal which cuts off the supply to motor 25 when the throttle opening has been changed by an amount proportional to the difference between actual IAS and the IAS set by the motor 17 which sets the reference speed and controls the position of the sector-shaped plate 14 through shaft 16 and worm 15. Motor 17 is a reversible motor having one pole permanently connected to the negative side of a source of D. C. supply and two leads 32 and 33 which, when separately connected to the positive of the same source by switch 34 or switch 35, cause the motor to run in one direction or the other. Switches 34 and 35 may be closed and opened by remote radio control or may be operated manually.

The mode of operation of this part of the apparatus is as follows:

Let it be supposed that the craft is flying at a given IAS corresponding to the reference speed previously set by motor 17. The armature 18 will then be symmetrically placed with reference to E pick-off 19 and motor 25 will be at rest. Now let it be supposed that the operator wishes to increase the speed of the plane. He will then close switch 34 when, unless the proposed new speed exceeds the limits of the safety devices hereinafter described, motor 17 will run and rotate plate 14 around axis 13 so that the E pick-off will no longer be symmetrical with respect to armature 18. This will cause motor 25 to run and change the throttle setting, thereby changing the IAS of the craft, which will ultimately result in the displacement of the bellows 10, the link 11 and the lever 12 so as to cause the armature 18 to follow the E pick-off. In the meantime the output of generator 26 after integration will send a repeat back signal, which is initially proportional to the throttle motion, through lead 29 to amplifier 24. This signal affords a temporary matching of the displacement of the servo with the error signal during changing or transient conditions and, because the repeat back signal gradually decays, both signals tend to reach zero values when the actual IAS is the same as the selected IAS. If, because of external variable factors or otherwise, the servo is brought to rest while the E pick-off still gives an error signal, this signal will effect a further operation of the servo until eventually close agreement will exist between the actual IAS and the preset value of the selected IAS.

It will be observed that when the machine is being controlled by radio signals from the ground, the reference IAS can be lowered or raised by the operation of switches 34 or 35 and the amount by which the speed is changed will depend upon the period during which the switch is kept closed and during which motor 17 drives the plate 14 in one direction or the other, about its pivot at 13. The control operator has, however, no direct means of knowing the absolute IAS and may unwittingly attempt to increase or decrease the speed beyond safe limits. To avoid this possibility various automatic safety limit switches are provided. If the IAS should be reduced to a low speed at which there would be danger of stalling the plane, a low limit switch is arranged to increase the IAS setting. If the IAS be increased to a point where the Mach number becomes dangerously high, another limit switch cuts out any signal there may be tending to increase the IAS, and introduces a signal to decrease the IAS. The Mach number being defined as the ratio between the true air speed and the velocity of sound, and since the indicated air speed differs from the true speed according to the barometric pressure, it follows that the IAS as given by rotation of shaft 47 must be affected by a barometer reading before the first term of the ratio is known. Further, since the velocity of sound is not constant at all altitudes but decreases as the altitude increases the second term of the ratio also includes a barometric factor.

We therefore provide an aneroid barometer element 71 which is mechanically connected by link 70 to a swinging contact arm 69 pivoted for rotation about an axis at 75 on a sector-shaped plate 74. Plate 74 is also mounted for rotation relative to the frame of the instrument round the same point 75 when driven by the worm 76 engaging with the toothed bottom portion of the sector. The swinging contact arm 69 carried by the sector 74, and also the parts 67, 68 and 69 are electrically insulated from one another. As the barometric pressure decreases or increases, the arm 69 is brought into contact with either contact 67 or 68. Arm 69 is electrically connected to the positive pole of the D. C. supply. Motor 79 is a reversible motor which may be of the well-known kind operating on direct current and having one terminal permanently connected by lead 60 to the negative D. C. supply. When wires 72 or 73 are connected to the positive of the supply, the motor will run in one direction or the other depending upon which of the two wires 72 and 73 is so connected. Since wires 72 and 73 are connected through limit switches 61 and 64 to contacts 67 and 68 it follows that the motor is set into rotation in one direction or the other when the arm 69 makes contact with the contact blocks 67 or 68. Motor 79 through shaft 78, drives worm 76 and rotates the sector 74 in such a direction as to stop the motor when the plate 74 has moved through an angle equal to the angle of displacement given to arm 69 by the barometer 71. Shaft 78 also carries cams 61' and 64' which operate the two limit switches 61 and 64 respectively pivoted at 62 and 65 and normally closing the circuits between the terminals 72 and 73 of the motor and the contacts 67 and 68.

The shaft 57 driven by the motor 79 drives into one side of a differential gear 51, the other side of which differential is driven by the IAS reference setting motor 17 through shaft 47. The middle shaft 52 of the differential therefore turns by an amount proportional to the difference between the rotations of shafts 47 and 57.

The rotation of shaft 52 may be made substantially proportional to a limiting Mach number as given by the reference IAS and barometer height by suitable design. The bellows of IAS indicator 10 may have such an expansion characteristic with change of differential air pressure that the movement of link 11 is substantially proportional to the square of the IAS. The expansion of the barometer diaphragm 71 may also have a non-linear expansion characteristic. A correction in the outputs of the two bellows 10 and 71 may be made by suitable choice of the angle which the link 11 makes with the arm 12, when in its normal position, or the angle that the link 70 makes with the contact arm 69, respectively. That is to say, by suitable choice of the linkage couplings, bellows characteristics and other parameters, a particular position of the differential shaft 52 can be made to correspond very closely to a given Mach number for a wide range of altitudes.

In the apparatus illustrated in Fig. 1 of the present invention, it is desirable that the IAS bellows 10 and the altitude bellows 71 both have substantially linear outputs, at least for a predetermined range of movement thereof. However, if these bellows do not have the desired non-linear outputs, a correction may be made in any conventional manner such as through the mechanical linkages illustrated in detail in Figs. 2 and 5. If the altitude or barometer bellows 71 has a non-linear output characteristic, the output may be rendered substantially linear by the arrangement illustrated in Fig. 2 of the drawings. As herein illustrated, expansion or contraction of the altitude bellows 71 translates the link 70 which, in turn, rotates the cam 80 through a radius arm defined by the pin connection 87 for the link 70 and the axis of rotation 75 of the cam 80. It will be noted that the link 70 is mounted at an angle relative to the neutral position of contact arm 69. In the well-known manner, through the proper selection of this angle and the length of the radius arm between the connection 87 and the pivot 75, the rotation imparted to contact arm 69 will be a predetermined function of the displacement of the altitude bellows 71 as, for example, linearly proportional to change in altitude.

As above stated, the IAS bellows 10 may have an expansion characteristic such that its output is substantially proportional to the square of the IAS. However, this non-linear output may be rendered substantially linear in the conventional way by a linkage system like that illustrated in Fig. 2. As illustrated in Fig. 5 of the drawings, the IAS bellows 10, and its output link 11 are mounted at an angle $\theta$ with respect to the neutral position of arm 12 which positions the armature 18 of the E pick-off 19. The link 11 rotates the arm 12 (preferably through a cam arrangement as illustrated in Fig. 2) and by means of a lever arm having a radius $a$. In this case, as in the case of the altitude bellows, by a proper selection of the angle $\theta$ and the length of the lever arm $a$, arm 12 will be rotated through an amount which is a predetermined function of the displacement of the link 11. Thus, if the IAS bellows 10 has an output which is proportional to the square of the IAS it is possible, through this construction, to transform the square function to a linear one and render the rotational displacement of the arm 12 substantially linearly proportional to movements of the bellows at least for a predetermined range of movement thereof. Since only small movements of the bellows 10 and 71 occur, rods 11 and 70 may be loosely coupled to its associated cam or lever to rotate the cam or lever through small angles. However, slot and pin connections may be provided as shown in Fig. 5.

Shaft 52 carries two cams 53 and 56 which operate switch blades pivoted at 54 and 59. So long as the speed of the craft is substantially below the predetermined Mach limit switch 58, 59 is closed and switch 54, 55 is open. As the reference IAS approaches the Mach limit, cam 56 opens switch 58, 59 and so makes it impossible to increase the reference IAS by closing the increase switch 34. If the Mach number continues to increase, as for example because the plane climbs to a higher altitude, shaft 52 will turn still further under the action of the barometer until cam 53 closes switch 54, 55 thus energizing the decrease terminal 33 of motor 17 from the positive D. C. supply. Motor 17 will then run and drive plate 14 and decentralize the E pick-off 19 causing the servo motor 25 to reduce the throttle opening. When the reference IAS has been reduced below the maximum limit, switch 54, 55 will again be opened, and on further reduction switch 58, 59 will be closed so that normal control by switch 34 can be resumed.

The low speed limiting switch, which comes into operation when the IAS reaches a predetermined lower limit, consists of a switch blade pivoted at 43', operated by cam 41' on shaft 39 which is driven by the bevelled gear 36, shaft 37, and bevel gear 38 from shaft 16. The switch blade pivoted at 43' is normally in contact with the "decrease" line 33 going to motor 17, but when the low limit of speed is reached, cam 41' opens the switch and so prevents the motor from being driven further in the decrease direction.

In case the motor 17 should run on by its own inertia and decrease the speed setting still further after the current has been switched off, a second switch blade is provided, pivoted at 43 and operated by cam 41 also on shaft 39. The hinge at 43 is connected as shown to the positive D. C. supply. This switch is normally open, but if motor 17 runs on after switch 43' has been opened, cam 41 will operate the switch and close the circuit through 43 and contact 42 to the "increase" terminal of the motor. In this way the IAS setting will be increased above the dangerous low limit, when the cam 41 will again break circuit.

In order to be able to establish a definite cruising speed, an alternative control of motor 17 is provided by a switch blade pivoted at 46 and playing between the contacts 44 and 45 under the action of cam 40 driven through shaft 39, bevelled gears 38, shaft 37 and bevelled gears 36 from the shaft 16 of motor 17. When this automatic cruise control is in use there is no signal from switches 34 and 35 and the cruising switch will be operated by cam 40 so as to energize the increase or decrease terminals 32 or 33 of motor 17 and so maintain the reference IAS at a predetermined value. When the speed is to be under the control of the operator, the line connecting the hinge 46 to the D. C. supply is broken by a relay switch 50. Similarly when the speed is to be controlled by the cruising switch alone, the leads from switches 34 and 35 are broken by relay switches 48 and 49. The relay coils for operating these switches 48, 49 and 50 may be controlled by radio signals from the ground. By these means when the ground operator is in doubt as to the actual IAS of the craft, he may operate the aforesaid relay and so put the control of the reference IAS to a known value, that, is to say, the preset cruising speed determined by cam 40. Thereafter the operator may cut out the cruising switch and resume control of the reference IAS himself.

Shaft 39 may carry several cams similar to cam 40 and contoured for different cruising speeds.

Having by means of the cruising device brought the craft to a known speed, the operator may now bring it to some desired higher or lower speed by closing either switch 34 or 35 for a greater or less time depending on the change of speed required.

In the case of the barometric control as shown in Fig. 1 the travel of the contact arm 69 is limited by contacts 67 and 68 and in order to avoid strain of the barometer diaphragm when these limits are reached we preferably use the arrangement shown in detail to a larger scale in Fig. 2 and Fig. 3. In this case the swinging arm 69, which is pivoted on plate 74 for rotation round an axis through 75, carries a light spring 81 which bears on a cam 80 rotatable about a stud projecting forward at 75 from the hub of the arm 69. The barometer 71 is connected by the link 70 to a pin 87 on cam 80 and when the cam is turned by the barometer, the arm 69 is caused to turn with it under the action of the spring 81 until contact is made on one or other of the blocks 67 or 68. Thereafter cam 80 may be turned still further by the barometer but the light spring 81 yields so that the barometer is not strained.

In order that the arm 69 shall turn freely and yet without shake or play, we prefer to mount it on a crossed spring suspension as shown in Fig. 3. This consists of a block 82 carried on the front of plate 74 and a similar block 83 carried on the back of the hub of arm 69, the two being connected by a pair of crossed elastic leaf springs 84 and 85 whose line of intersection forms the axis 75 about which arm 69 can turn relatively to the plate 74 through the small angle that is necessary to touch contacts 67 or 68. It will be understood that a similar mechanical construction may also be applied to the sector plate 14 and arm 12 of the IAS control element.

If preferred the barometer follow-up contacts 67 and 68 may be replaced by an E pick-off or similar device as part of a proportional speed follow-up of any type commonly used in the art of servo mechanism.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An air speed control for aircraft comprising a device responsive to air speed, a servo motor for operating the controller of the fuel supply to the motor of the aircraft, a reference element adapted to be set according to the desired indicated air speed of the craft, means for setting said element to a predetermined reference air speed, motor means for changing the setting of said element to increase or decrease the reference air speed, means for limiting a setting of said element to a minimum indicated air speed, a barometer, means controlled in accordance with the setting of said reference element and jointly by said barometer for restricting the reference air speed that can be set within a safe maximum limit, and means for controlling said servo motor according to the differential displacement of said air speed responsive device and said reference element so as to annul said displacement by varying the speed of the craft through the fuel supply.

2. In an automatic device for controlling the speed of aircraft through the controller of the fuel supply to the motor of the aircraft, an air speed reference device, a barometric altitude measuring device, means controlled in accordance with the setting of said air speed reference device and jointly by said altitude-measuring device for limiting the maximum reference air speed to a predetermined maximum Mach number, and means operated by said air speed reference device for limiting the reference air speed to a predetermined minimum value.

3. In an automatic device for controlling the air speed of an aircraft through the controller of the fuel supply to the propelling motor, means for measuring the air speed of the craft, a pick-off device for producing a signal dependent upon deviation between the air speed of the craft from a desired air speed, said pick-off device comprising first and second positionable members, said first member being connected to be operated by said air speed measuring means and positioned in accordance with the actual air speed of the craft, a motor connected to position said second member to positions corresponding to desired air speeds, means for controlling said motor to provide a displacement output corresponding to said desired air speed, and servo means responsive to said deviation signal for actuating said fuel supply controller whereby to increase or decrease the air speed to an air speed corresponding to the desired air speed.

4. In an automatic speed controller as in claim 3, a cam driven by the motor which moves the second member of said pick-off device, and a plurality of switches operated by said cam and controlling said motor so that the reference air speed may automatically be set to a predetermined value depending on the contour of said cam.

5. In an automatic speed controller as in claim 3, a cam driven by the motor which moves the second member of said pick-off device, and a plurality of switches operated by said cam and controlling said motor so that the reference air speed may automatically be set to a selected one of a plurality of predetermined values depending on the contour of said cam.

6. In an automatic device for controlling the indicated air speed of an aircraft, a motor driven reference for the desired speed, a barometer sensitive to altitude, and an element driven differentially in accordance with the setting of said reference and the output of said barometer so that a particular position of said differential element shall correspond to a given Mach number according to the existing altitude combined with the reference indicated air speed and switch gear operated by said element so as to limit the air speed reference to a value not exceeding a predetermined Mach number.

7. An automatic device for controlling the speed of aircraft as in claim 6 in which switch means are provided for preventing further increase of reference air speed when a predetermined Mach number limit is reached and to cause a decrease of reference air speed when said predetermined limit is substantially exceeded.

8. An automatic speed controller as in claim 3 having relays adapted for remote control by radio signals, said relays being arranged to start, stop and reverse the motor driving the second member of said pick-off device according to said signals.

9. An automatic speed controller as in claim 2 wherein the means for limiting the indicated air speed to a predetermined minimum value comprises an electric motor for increasing and decreasing the indicated air speed reference, relay switches normally controlling said motor, a cam driven by said motor, switch gear operated by said cam and connected so as to over-ride said relay switches and prevent the motor from decreasing said speed reference when a predetermined minimum value of said reference is reached.

10. An automatic speed controller as in claim 2 wherein the means for limiting the indicated air speed to a predetermined minimum value comprises an electric motor for increasing and decreasing the indicated air speed reference, relay switches normally controlling said motor, a cam driven by said motor, switch gear operated by said cam and connected so as to over-ride said relay switches and cause the motor to increase said speed reference when a predetermined minimum value of said reference is reached.

11. An automatic speed controller as in claim 1 wherein the means for controlling the servo motor comprises an armature connected to the air speed indicator so as to yield when a predetermined force is exceeded, and a pick-off set by the reference setting motor and controlling said servo motor according to the relative displacement of said armature and said pick-off.

12. An automatic speed controller as in claim 2 wherein the means for limiting the air speed to a predetermined Mach number comprises an air speed reference element, a first electric motor for setting said reference element, a barometer, a contact arm connected to said barometer so as to yield when a predetermined force is exceeded, a follow-up element cooperating with said contact arm, a second electric motor controlled by and driving said follow-up element, a differential having its two extreme gears operated by said two motors respectively, a plurality of cams driven by the middle gear of said differential and switch gear operated by said cams and controlling said first motor so as to prevent said reference element from being set at an air speed that would exceed a predetermined Mach number at the altitude indicated by said barometer.

13. In an automatic device for controlling the air speed of an aircraft through the controller of the fuel supply to the propelling motor, a pressure actuated bellows having an output displacement proportional to the air speed of the craft, a pick-off device for producing a signal dependent upon deviation between the air speed of the craft from a desired air speed, said pick-off device comprising first and second positionable members, said first member being connected to be operated by said bellows and positioned in accordance with the actual air speed of the craft, a motor connected to position said second member to positions corresponding to desired air speeds, means for controlling said motor to provide a displacement output corresponding to said desired air speed, and servo means responsive to said deviation signal for actuating said fuel supply controller whereby to increase or decrease the air speed to an air speed corresponding to the desired air speed.

14. In an automatic device for controlling the air speed of an aircraft through the controller of the fuel supply to the propelling motor, means for measuring the air speed of the craft, a pick-off device for producing a signal dependent upon deviation between the air speed of the craft from a desired air speed, said pick-off device comprising first and second positionable members, said first member being connected to be operated by said air speed measuring means and positioned in accordance with the actual air speed of the craft, a motor connected to position said second member to positions corresponding to desired air speeds, means for controlling said motor to provide a displacement output corresponding to said desired air speed, servo means responsive to said deviation signal for actuating said fuel supply controller whereby to increase or decrease the air speed to an air speed corresponding to the desired air speed, an altimeter and mechanism controlled thereby for providing an output proportional to altitude, and means responsive to the output of said mechanism and to the output of said motor for limiting the air speed value to which the second member of said pick-off may be set.

15. In an automatic device for controlling the air speed of an aircraft through the controller of the fuel supply to the propelling motor, means for measuring the air speed of the craft, a pick-off device for producing a signal dependent upon deviation between the air speed of the craft from a desired air speed, said pick-off device comprising first and second positionable members, said first member being connected to be operated by said air speed measuring means and positioned in accordance with the actual air speed of the craft, a motor connected to position said second member to positions corresponding to desired air speeds, means for controlling said motor to provide a displacement output corresponding to said desired air speed, means for limiting the displacement output of said motor in one direction so as to prevent a setting of the second member of said pick-off corresponding to a value below some predetermined minimum value, and servo means responsive to said deviation signal for actuating said fuel supply controller whereby to increase or decrease the air speed to an air speed corresponding to the desired air speed.

References Cited in the file of this patent

UNITED STATES PATENTS

| | | |
|---|---|---|
| 1,418,131 | Curtiss | May 30, 1922 |
| 1,978,863 | Gregg et al. | Oct. 30, 1934 |
| 2,191,250 | Fischel | Feb. 20, 1940 |
| 2,273,022 | Crane et al. | Feb. 17, 1942 |
| 2,415,092 | Frische et al. | Feb. 4, 1947 |